June 29, 1937.  H. W. WILLIAMS  2,085,135
POSITION INDICATOR
Filed March 15, 1935   2 Sheets-Sheet 1
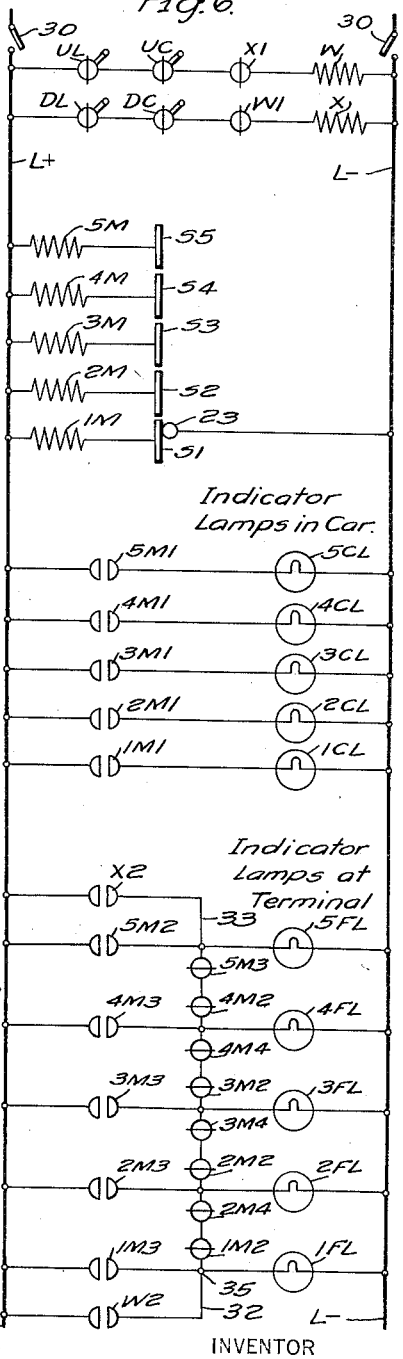
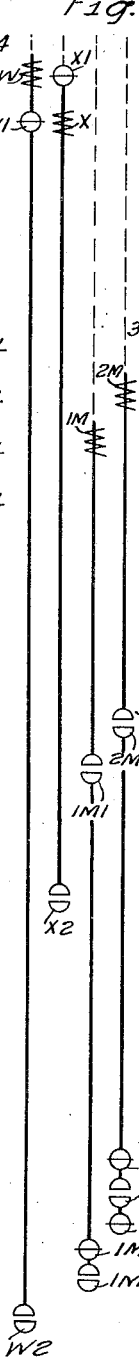
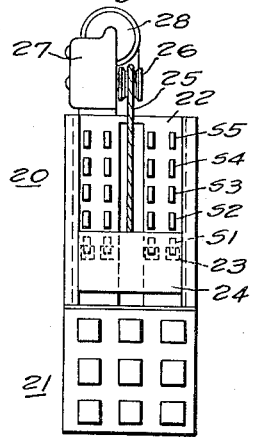
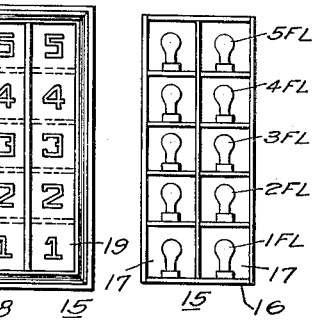
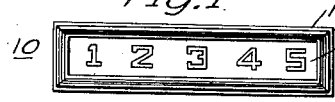
WITNESSES:
INVENTOR
Harold W. Williams.
BY
ATTORNEY June 29, 1937.  H. W. WILLIAMS  2,085,135
POSITION INDICATOR
Filed March 15, 1935   2 Sheets-Sheet 2
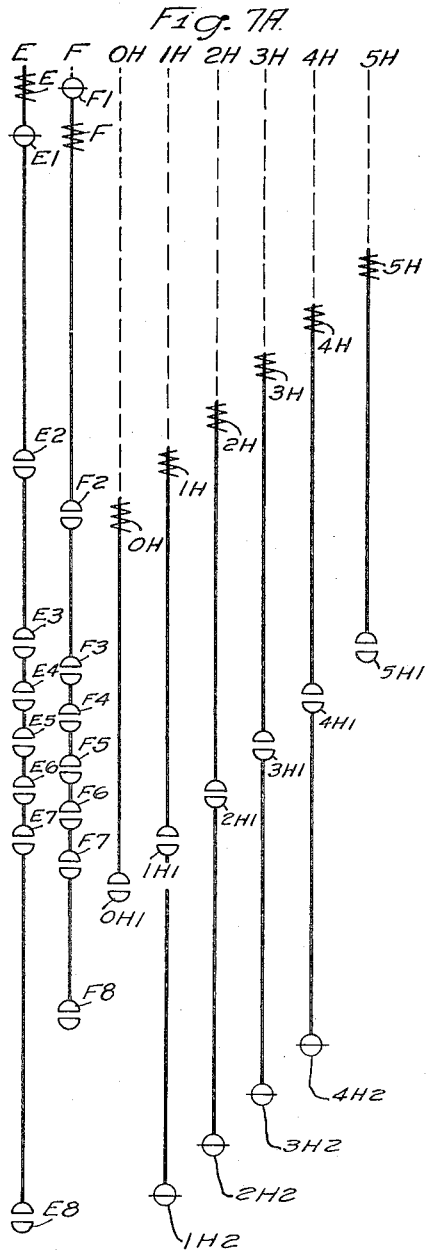
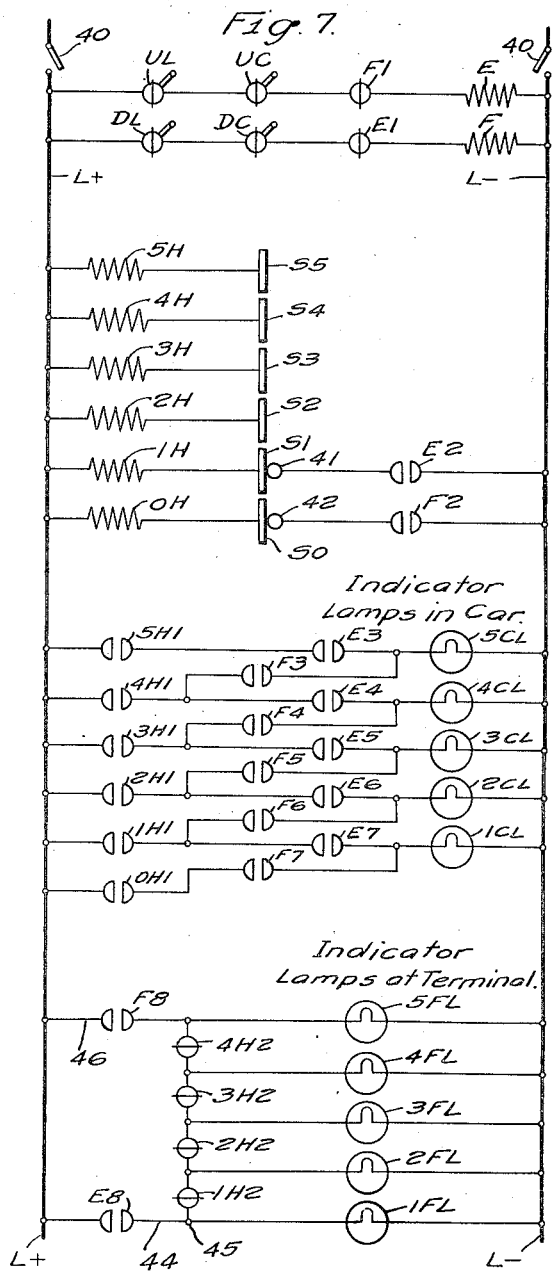
WITNESSES:  INVENTOR
E. A. McCloskey  Harold W. Williams
Birney Hines  BY
  ATTORNEY Patented June 29, 1937

2,085,135

UNITED STATES PATENT OFFICE 2,085,135

POSITION INDICATOR

Harold W. Williams, Chicago, Ill., assignor to Westinghouse Electric Elevator Company, Chicago, Ill., a corporation of Illinois Application March 15, 1935, Serial No. 11,284

11 Claims. (Cl. 177—336)

My invention relates to position indicators and to position and direction indicators for elevator cars, and more particularly to the means for operating such indicators.

In some elevator installations, it is desirable to have an electrically operated position indicator disposed in each car for indicating the position of the car relative to the floors it is serving and to also provide an electrically operated indicator disposed at the ground floor or terminal for indicating both the position and the direction of operation of each car.

Heretofore separate mechanisms have been provided for operating the position indicator in the car and the position and direction indicator for that car at the terminal. These mechanisms usually require a plurality of rows of contact segments and cooperating brushes on the floor selector the brushes being operated over the segments in accordance with the movement of the car. The number of vertical rows of contact segments which may be accommodated on each selector is limited by its width. Therefore, when many signals or other devices are to be operated through the rows of contact segments, the addition of a plurality of contact segments for position and direction indicators increases the problem of the elevator constructor in providing selector space for all of the necessary rows of segments.

Also, in practice, the constructors usually carry selectors of standard sizes in stock. Thus, whenever an installation requires a floor selector of unusual width to accommodate additional rows of contact segments, the selector must be of such special design and construction that its cost is increased considerably over the cost of the standard forms of selectors.

Therefore, one object of my invention is to provide a means for operating position indicators and direction indicators which shall require only a small number of rows of contact segments and cooperating brushes on the floor selector.

A further object is to produce a system which shall require less wiring and fewer circuit connections than have been necessary heretofore.

It is also an object of my invention to provide position and direction indicators which may be easily and economically constructed, installed and maintained in operation.

These and other objects of the invention will be apparent in the following specification, taken in conjunction with the accompanying drawings, in which:

Figure 1 is a view, in front elevation, of a car position indicator for use in an elevator car;

Fig. 2 is a view in front elevation of the car position indicator shown in Fig. 1 with the cover removed to show the indicating lamps disposed therein.

Fig. 3 is a view in front elevation of a car position and direction indicator which may be disposed at a terminal or at a dispatcher's station for a plurality of cars;

Fig. 4 is a view in front elevation of the position and direction indicator shown in Fig. 3 with the cover removed to show the position and direction lamps therein;

Fig. 5 is a view, in front elevation, of a floor selector for connecting the signal and control circuits of a car in accordance with the position of that car;

Figs. 6 and 6A comprise a diagrammatic representation of the circuits for controlling and operating the indicators shown in Figs. 1 to 4, inclusive, and, Figs. 7 and 7A comprise a diagrammatic representation of a modification of the system of circuits shown in Figs. 6 and 6A.

The illustration of the relays in Figs. 6A and 7A shows them with their coils and contact members disposed in horizontal alinement with their positions in the straightline circuits of Figs. 5 and 6 so that the reader may readily determine the identification of any relay, the number and kind of its contact members, and the position of its coil and contact members in the straightline circuits.

In connection with the reference characters, the prefix numerals indicate the numbers of the floors and the suffix numerals indicate the numbers of the contact members on the relay. For instance, the reference character 2M2 indicates the contact members 2 of the indicator relay M for the second floor.

Referring more particularly to Figs. 1 and 2 of the drawings, I have provided a car position indicator 10 for an elevator car operating in a shaftway serving five floors. The indicator comprises a box-like frame 11 divided into a series of compartments by a plurality of partitions 12, there being a compartment corresponding to each of the five floors. In each compartment is disposed a signal device such as an electric incandescent lamp to be lighted when the car is at the corresponding floor. The lamps are numbered 1CL for the first floor, 2CL for the second floor, 3CL for the third floor, 4CL for the fourth floor, and 5CL for the fifth floor. The lamps and compartments are covered by a frame 13 bearing a glass cover plate 14. The face of the glass plate is provided with a plurality of raised numerals corresponding to, and covering, the lamps for the five floors, the numeral 1 for indicating the first floor, the numeral 2 for the second floor, the numeral 3 for the third floor, the numeral 4 for the fourth floor and the numeral 5 for the fifth floor.

The surface of the glass plate surrounding the numerals may be painted or otherwise treated, if desired, to decrease the transmission of light from the lamps in the frame 11 so that when a lamp behind the glass plate is lighted its corresponding numeral will be illuminated. For instance, when the lamp 1CL is illuminated, the numeral 1 in the plate will be illuminated, but none of the remaining numerals will be illuminated unless the lamp behind it is illuminated. This indicator is of the "jump" type; that is, one in which only the lamp for the floor corresponding to the car is illuminated.

The indicator may be mounted in any desired position in the car (not shown), usually above the door, where the passengers may readily discern the illuminated numeral indicating the floor corresponding to the position of the car.

In Figs. 3 and 4, I have shown an indicator 15 of the "thermometer" or progressive type in that a plurality of indicating devices, one for each floor, upon being successively operated, stay operated after the car passes until it reaches the opposite terminal to indicate not only the position but the direction of travel of the car. This indicator may be disposed at any position in the system where it is desired to inform intending passengers or others of the position and direction of operation of the cars. In the present instance the indicating means for two cars are combined for disposition at a dispatcher's stand (not shown) for indicating to the dispatcher the relative position of the cars with reference to each other and with reference to the floors and also their direction of operation.

As one form of a suitable indicator 15, I have illustrated it as comprising a box-like frame 16 provided with two vertical rows of compartments 17 in each of which is disposed a signal device such as an electric incandescent lamp. The lamps in the right hand row are indicated as 1FL for the first floor, 2FL for the second, 3FL for the third, 4FL for the fourth, and 5FL for the fifth. The lamps in the left hand column may be utilized for another car in the system. A cover 18 having a glass plate 19 is provided for the frame 16 and the lamps therein. The glass plate is provided with two vertical rows of raised glass numerals 1, 2, 3, 4 and 5 corresponding to the floors which the cars serve. The surface of the glass plate surrounding the numerals is also painted or otherwise treated to prevent the passage of light therethrough so that when the plate or cover 18 is disposed on the frame 16, the numeral 1 in the right hand column will be illuminated by operation of the lamp 1FL and the numerals 2, 3, 4 and 5 will be illuminated by the lamps in the compartments which they cover in a similar manner.

As shown in Fig. 5, a floor selector 20 and a plurality of position and direction relays 21 are provided for operating the lamps 1CL etc. in the car and the lamps 1FL, etc. at the dispatcher's station.

The floor selector may be of any well known type such as is provided with a plurality of contact segments, S1 corresponding to the first floor, S2 the second floor, S3 the third floor, S4 the fourth floor and S5 the fifth floor. The contact segments are disposed in a vertical row on the front face 22 of the floor selector in position to be engaged by a suitable brush 23. The brush 23 is mounted upon and insulated from a selector carriage 24 operated by a cable 25 passing over a drum 26, operated by a speed reducing gear 27 and a motor 28 driven in accordance with the movements of the car in any well known manner. As the car moves up and down its hatchway, the carriage 24 moves the brush 23 over the contact segments S1 etc. in accordance with the movements of the car. It is to be understood that additional rows of segments on the selector may be provided for other signal devices, etc.

Referring more particularly to Figs. 6 and 6A, a plurality of position relays are provided for controlling the circuits of the lamps in the position indicator 10 and in the position and direction indicator 15 and are designated as 1M for the first floor, 2M for the second floor, 3M for the third floor, 4M for the fourth floor and 5M for the fifth floor.

An up direction relay W and a down direction relay X are provided for controlling the direction of operation of the lamps in accordance with the direction and progress of the car. The up direction relay W is controlled by a limit switch UL at the upper landing and the down direction relay X is controlled by a limit switch DL at the lower terminal, so that the direction of operation of the indicators will be changed when the car reaches its terminals.

The circuit of the up direction relay W is also provided with a control switch UC and the down direction relay X with a control switch DC. The control switches may be so connected in the control system (not shown) of the car that operation of the control system to reverse the car will cause the corresponding control switch in a direction relay circuit to open and deenergize that relay. The direction relays are provided with interlocking contact members. Hence when a control switch for one direction deenergizes a direction relay, the relay for the reverse direction is immediately energized so that the direction indicating lamps will be energized in accordance with the direction of operation of the car even when it reverses without running to a terminal. For instance, if the car reverses its direction while on its up trip, the UC switch will open, thus deenergizing the up direction relay W which thereupon closes its contact members W1 thereby causing the down direction relay X to be energized.

The invention may be understood best by an assumed operation of the system.

It will be assumed now that the car is standing at the lower terminal and that the indicator system is placed in operation by closing the switches 30 to connect the circuit for the indicator system to a source of supply (not shown) of electric energy. Inasmuch as the car is standing at the lower floor, the lower limit switch DL is open thereby deenergizing the down direction relay X which, in turn, closes its contact members X1, thereby energizing the up direction relay W by a circuit extending from the supply conductor L+ through the contact members of up limit switch UL, control switch UC, the contact members X1 and the coil W to the supply conductor L−.

The energization of the relay W opens its contact members W1 in the circuit of the down direction relay X to interlock that circuit and closes its contact members W2 to prepare an up direction circuit 32 for maintaining the lighting of the lamps after they are operated for the up direction until the car reverses or reaches the upper terminal. Hence the circuit 32 provides for the progressive or "thermometer" lighting of the lamps to indicate the up direction operation of the car. The closed contact members W2 also light the lamp 1FL in the indicator 15 at the dispatcher's desk to indicate that the car is at the lower floor and is ready to start or is starting on an up trip.

Inasmuch as the brush 23 is disposed on the contact segment S1 of the floor selector, the relay 1M is energized by a circuit extending from the supply conductor L+ through the coil 1M, the contact segment S1 and the brush 23 to the supply conductor L—.

The energization of the relay 1M closes its contact members 1M1 and 1M3 and opens its contact members 1M2. The closing of the contact members 1M1 lights the lamp 1CL in the position indicator 10 by a circuit extending from the supply conductor L+ through the contact members 1M1 and the lamp 1CL to the supply conductor L—, thereby illuminating the numeral 1 in the position indicator in the car to indicate to anyone in that car that it is standing at the first floor.

The closing of the contact members 1M3 provides a circuit for the lamp 1FL extending from the supply conductor L+ through the contact members 1M3 and the lamp 1FL to the supply conductor L— but this lantern is already operated by the contact members W2 of the up direction switch. However, the circuit through the contact members 1M3 is useful when the car is coming down to the first floor as it then lights lamp 1FL before the car actually effects the closing of the up direction switch.

The opening of the contact members 1M2 in the up circuit 32 prevents the "thermometer" circuit from lighting any lamps for the floors above the first floor.

It will be assumed now that the car moves to the second floor and in so doing moves the contact brush 23 of the floor selector from the contact segment S1 to the contact segment S2. The disengagement of the brush 23 from the contact segment S1 and its engagement with the contact segment S2 serves to open the circuit of relay 1M and to close the circuit of the relay 2M thereby deenergizing the relay 1M but energizing the relay 2M, the circuit for relay 2M extending from supply conductor L+ through the relay 2M, the contact segment S2 and the brush 23 to the supply conductor L—.

The deenergization of the relay 1M opens its contact members 1M1 thus extinguishing the lamp 1CL in the position indicator 10. The closing of the contact members 1M2 extends the up direction circuit coming through the contact members W2. The opening of the contact members 1M3 would extinguish the lamp 1FL but that lamp receives a supply of energy through the closed contact members W2 and therefore remains lighted to indicate the up direction of operation of the car.

The energization of the relay 2M closes its contact members 2M1 and 2M3 and opens its contact members 2M2 and 2M4. The closing of the contact members 2M1 lights the lamp 2CL by a circuit extending from supply conductor L+ through contact members 2M1 and the lamp 2CL to the supply conductor L—. The lighted lamp 2CL illuminates the numeral 2 in the position indicator 10 and thereby informs the passengers in the car that it is at the second floor. The opening of the contact members 2M2 and 2M4 serves to limit the direction circuit 32 through the closed contact members W2. The closing of the contact members 2M3 lights the indicator lamp 2FL in the position and direction indicator 15 thereby illuminating the corresponding numeral 2. The illumination of the numerals 1 and 2 in the right hand column of the floor indicator indicates to the dispatcher that the car is at the second floor and is moving in the up direction.

As the car goes from the second floor to the third floor the contact brush 23 leaves the contact segment S2 thereby deenergizing the relay 2M and engages the contact segment S3 thereby energizing the relay 3M. The deenergization of the relay 2M opens its contact members 2M1 and 2M3 and closes its contact members 2M2 and 2M4. The opening of the contact members 2M1 extinguishes the lamp 2CL in the position indicator 10 in the car, thereby preventing the illumination of the numeral 2 in that indicator. The opening of the contact members 2M3 opens one circuit of the lamp 2FL. However, the closing of the contact members 2M4 extends the direction circuit 32 so that the lamp 2FL remains lighted by a circuit extending from the supply conductor L+ through the contact members W2, 1M2 and 2M4 and the lamp 2FL to the supply conductor L—. The closing of the contact members 2M2 prepares a continuation of the direction circuit 32.

The energization of the relay 3M closes its contact members 3M1 and 3M3 and opens its contact members 3M2 and 3M4. The closing of the contact members 3M1 lights the lamp 3CL back of the numeral 3 in the position indicator 10 thereby indicating to the passengers in the car that the car is now at the third floor. The closing of the contact members 3M3 lights the lamp 3FL by a circuit extending from the supply conductor L+ through the contact members 3M3 and the lamp 3FL to the supply conductor L—. The lighting of the lamp 3FL in the indicator 15 illuminates the corresponding numeral 3 and inasmuch as in this indicator the numerals 1, 2 and 3 corresponding to the lamps 1FL, 2FL and 3FL are lighted, they indicate to the floor dispatcher that the car is at the third floor and is travelling in the up direction.

It will be assumed now that the car moves on up to the fifth floor, lighting the indicator lamps for the fourth floor in the same manner as described for the lower floors.

As the car moves into the fifth floor or upper terminal, the up limit switch UL is operated to open its contact members, thereby deenergizing the up direction relay W to close its contact members W1 and open its contact members W2. The opening of the contact members W2 deenergizes the up direction circuit 32 thereby extinguishing the lamps 1FL, 2FL, 3FL and 4FL so that they no longer indicate up direction travel. The closing of the contact members W1 energizes the down direction relay X by a circuit extending from the supply conductor L+ through the contact members DL, DC and W1 and the relay X to the supply conductor L—.

The energization of the relay X opens its interlocking contact members X1 in the circuit of the relay W and closes its contact members X2 in the down direction circuit 33 for preparing that circuit to progressively illuminate the lamps in the indicator 15 at the dispatcher's floor as the car moves downwardly. Inasmuch as the car is at the fifth floor, the brush 23 is on the contact segment S5, thereby energizing the indicator relay 5M to close its contact members 5M1 and 5M2 and open its contact members 5M3. The closing of the contact members 5M1 lights the lamp 5CL by a circuit extending from supply conductor L+ through the contact members 5M1 and the lamp 5CL to the supply conductor L—. The lighting of the lamp 5CL in the position indicator 10 illuminates the numeral 5 thereby indicating to passengers in the car that the car is at the fifth floor. The opening of the contact members 5M3 limits the down direction lamp circuit 33 below the lamp at the fifth floor, where the car is located.

It is assumed that the car now moves downward to the fourth floor. In so doing the brush 23 leaves the contact segment S5 and engages the contact segment S4 thereby deenergizing the relay 5M and energizing the relay 4M. The deenergization of the relay 5M opens its contact members 5M1, thereby extinguishing the lamp 5CL in the car position indicator 10, opens its contact members 5M2 in the circuit for the lamp 5FL, and closes its contact members 5M3 thereby preparing the down direction circuit 33 for progressively maintaining the lighted lamps in indicator 15 in their lighted condition as the car travels downwardly.

The energization of the relay 4M closes its contact members 4M1 and 4M3 and opens its contact members 4M2 and 4M4. The closing of the contact members 4M1 lights the lamp 4CL behind the numeral 4 in the car indicator 10 thereby indicating to the passengers in the car that it is now at the fourth floor. The closing of the contact members 4M3 lights the lamp 4FL by a circuit extending from the supply conductor L+ through the contact members 4M3 and the lamp 4FL to the supply conductor L—. The opening of the contact members 4M2 and 4M4 limits the extension of the down direction circuit 33. Inasmuch as the lamps 5FL and 4FL in the position indicator at the dispatcher's desk are now illuminated while the lamps 3FL, 2FL and 1FL are not illuminated, the dispatcher is informed that the car has come down to the fourth floor and is now at that floor.

By reason of the foregoing operation, it is seen that the passengers on the car are kept informed by the "jump" position indicator 10 as to the position of the car with reference to the floors it serves, while the dispatcher is kept informed not only as to the position of the car with reference to the floors it serves, but also as to the direction in which it is progressing.

It will be also observed that only one row of contact segments and a single brush therefor are required for operating both the position indicator in the car and the position and direction indicator at the terminal.

It will now be assumed that the car at the fourth floor is reversed and starts upwardly instead of continuing its down trip. The operation of the reversing means to run the car in the upward direction opens the down control switch DC, thereby deenergizing the down direction relay X which closes its contact members X1 and opens its contact members X2. The opening of the contact members X2 deenergizes the down direction circuit 33 for the position and direction indicator lamps 5FL and 4FL, thereby extinguishing them. The closing of the contact members X1 energizes the up direction relay W by a circuit as heretofore described, thereby causing that relay to open its contact members W1 and close its contact members W2. The opening of the contact members W1 interlocks the circuit of the down direction relay X and the closing of the contact members W2 prepares the up direction circuit 32 for energization.

Inasmuch as the car is still at the fourth floor, its brush 23 is still on the contact segment S4, the relay 4M is still energized, the numeral 4 in the indicator 10 is still illuminated by the lamp 4CL and the lamp 4FL for the fourth floor in the indicator at the supervisor's desk is still illuminated. However, the closing of the contact members W2 completes the direction progress circuit for lighting the lamps 1FL, 2FL and 3FL to indicate to the dispatcher that the car is now at the fourth floor and ready to move upwardly. The circuit for the lamps 1FL, 2FL, and 3FL extends from the supply conductor L+ through the conductor 32 to a junction point 35, thence through the lamp 1FL to the supply conductor L—; also from the junction 35 through the contact members 1M2 and 2M4 and the lamp 2FL to the supply conductor L—; and also from the junction point 35 through the contact members 1M2, 2M4, 2M2 and 3M4 and the lamp 3FL to the supply conductor L—.

By reason of the foregoing, it will be seen that, with my improvement, a change in the direction of operation of a car will cause a corresponding change in the direction of the illuminated lamps and numerals in the position and direction indicator 15, thereby keeping the dispatcher informed at all times of the position and direction of operation of the car.

In some instances it may be desirable to employ the modified indicator circuits shown in Figs. 7 and 7A. In this modification, an up direction relay E and a down direction relay F are provided for controlling the operation of the indicating lamps in accordance with the direction of operation of the car. The floor selector is provided with contact segments similar to the contact segments shown in the system described in connection with Figs. 6 and 6A with the addition of an extra contact segment SO to permit the use of a brush 41 for the up direction and a brush 42 for the down direction. The contact segments are connected with a plurality of position relays OH, 1H, 2H, 3H, 4H and 5H which are similar to the direction relays in Figs. 6 and 6A, except that an additional relay OH is provided on account of the use of a brush for each direction.

The lamps for the position indicator in the car and the lamps for the position and direction indicator at the dispatcher's terminal correspond to and are given the same reference characters as those in Fig. 6.

In connection with the system shown in Figs. 7 and 7A, it will be assumed that the car is standing at the lower terminal and that the switches 40 are closed to connect the indicator circuits to a suitable source of electrical energy (not shown). Inasmuch as the car is standing at the lower floor, the down limit switch DL is open, thus deenergizing the down direction relay F to close its contact members F1 and thereby energize the up direction relay E by a circuit extending from the supply conductor L—1 through the contact members of the upper limit switch UL and the up control switch UC, contact members F1 and the coil E to the supply conductor L—1.

The energization of the up direction relay E opens its contact members E1 and closes its contact members E2, E3, E4, E5, E6, E7 and E8. The closing of the contact members E3 to E7 prepares the circuits of the lamps 1CL to 5CL, inclusive, in the position indicator 10 for operation while the car moves in the up direction. The closing of the contact members E8 prepares the up direction circuit 44 for maintaining in operation the indicator lamps 1FL to 5FL, inclusive, after they have been operated by movement of the car in the up direction.

The closing of the contact members E8 also lights the lamp 1FL by a circuit extending from the supply conductor L+1 through the contact members E8 and the lamp 1FL to the supply conductor L—1. The lighting of the lamp 1FL illuminates the numeral 1 in the right-hand column of the position and direction indicator 15 at the dispatcher's desk to indicate that the car is at the ground floor.

The closing of the contact members E2 connects the brush 41 to the supply conductor L—1 for operation of the car in the up direction.

Inasmuch as the car is standing at the lower terminal and the contact member E2 is closed, the position relay 1H is energized by a circuit extending from the supply conductor L+1 through the coil 1H, the contact segment S1, brush 41 and contact members E2 to the supply circuit L+1. The energization of the relay 1H closes its contact members 1H1, energizing the lamp 1CL in the position indicator 10 by a circuit extending from the supply conductor L+1 through the contact members 1H1 and E7 and the lamp 1CL to the supply conductor L—1. The lighting of the lamp 1CL illuminates the numeral 1 in the position indicator 10 to indicate to passengers in the car that it is standing at the first floor.

The energization of the relay 1H also opens its contact members 1H2, preventing lighting of the terminal indicator lamps FL above the first floor.

It will be assumed now that the car moves to the second floor. This action causes the up brush 41 to leave the contact segment S1 and move into engagement with the contact segment S2, thereby deenergizing the position relay 1H and energizing the position relay 2H.

The deenergized relay 1H opens its contact members 1H1 and thereby extinguishes the lamp 1CL in the position indicator 10. The deenergized relay 1H also closes its contact members 1H2 to permit lighting of the lamp 2FL corresponding to the second floor.

The energization of the relay 2H closes its contact members 2H1 and opens its contact members 2H2. The closing of the contact members 2H1 lights the lamp 2CL, thereby illuminating the numeral 2 in the position indicator 10 to indicate to the passengers in the car that it has now moved to the second floor. The opening of the contact members 2H2 limits the up direction circuit 44 to prevent illumination of the direction position lamps above the second floor but leaving the lamp 1FL at the first floor and lamp 2FL for the second floor illuminated by a circuit extending from the supply conductor L+1 through the contact members E8 to a junction point 45, one branch extending through the lamp 1FL to the supply conductor L—1 and the other branch extending from the junction point 45 through the contact members 1H2 and the lamp 2FL to the supply conductor L—1. The sequential and maintained operation of the lamps 1FL and 2FL illuminate their corresponding numerals 1 and 2 on the position and direction indicator 15 to indicate to the dispatcher that the car is at the second floor and also that it is on an up trip.

It will be assumed now that the car moves to the third floor and in so doing causes the brush 41 to leave the contact segment S2 and engage the contact segment S3, thereby deenergizing the position relay 2H and energizing the position relay 3H. The deenergization of the relay 2H opens its contact members 2H1 to extinguish the lamp 2CL in the position indicator 10 and closes its contact members 2H2 to extend the up direction circuit 44 to include the lamp 3FL therein. This operation lights the lamp 3FL in addition to the lamps 1FL and 2FL, thereby causing them to illuminate their corresponding numerals 1, 2 and 3 in position and direction indicator 15 for the purpose of notifying the dispatcher that the car is at the third floor and travelling in the up direction. At the same time the opening of the contact members 3H2 limits the up direction circuit 44 and prevents the lighting of the lamp 4FL at the fourth floor.

The closing of the contact members 3H1 lights the lamp 3CL which illuminates the numeral 3 in the position indicator 10, thereby indicating to the passengers in the car that it is now at the third floor.

As the car continues upwardly, it leaves the third floor, thereby moving the brush 41 from the contact segment S3 to the contact segment S4 thus deenergizing the position relay 3H and energizing the position relay 4H. The deenergization of the relay 3H opens its contact members 3H1, thereby extinguishing the lamp 3CL in the position indicator 10 and closes its contact members 3H2 to extend the up direction circuit 44 to include the lamp 4FL in the position and direction indicator, thereby notifying the dispatcher that the car is now travelling upwardly at the fourth floor.

The energization of the relay 4H opens its contact members 4H2 to limit the up direction circuit 44 for the position and direction lamps to the fourth floor. The closing of the contact members 4H1 completes a circuit for lighting the lamp 4CL in the position indicator in the car.

As the car moves to the fifth floor, the brush 41 leaves the contact segment S4 and engages the contact segment S5 thereby deenergizing the position relay 4H and energizing the position relay 5H. The deenergized position relay 4H opens its contact members 4H1, thereby deenergizing the position indicator lamp 4CL and closes its contact members 4H2 thereby extending the up direction circuit 44 to include the position and indicator lamp 5FL for the fifth floor. The energization of the relay 5H closes its contact members 5H1 to light the lamp 5CL in the position indicator 10 for the fifth floor.

As the car moves into the fifth floor, the upper limit switch UL is opened, thereby deenergizing the up direction relay E to close its contact members E1 and open its contact members E2 to E8, inclusive. The closing of the contact members E1 energizes the down direction relay F. The opening of the contact member E8 opens the up direction circuit of the lamps 1FL to 5FL thereby extinguishing the direction lamps 1FL etc. below the car. The opening of the contact members E2 disconnects the contact brush 41 from the supply conductor L—1. The opening of the contact members E3 to E7 disconnects the circuits of the lamps 1CL etc. from up direction operation.

The energization of the down direction relay F opens its contact members F1 and closes its contact members F2 to F8, inclusive. The opening of the contact members F1 interlocks the circuit of the up direction relay E. The closing of the contact members F2 connects the brush 42 to the supply conductor L—1 for operation of the car in the down direction.

The closing of the contact members F3 to F7, inclusive, prepares the lamps 1CL to 5CL in the position indicator for operation in accordance with the downward travel of the car.

The closing of the contact members F8 prepares the down direction circuit 46 to operate the lamps 5FL to 1FL, inclusive, in accordance with the down operation of the car.

Inasmuch as the car is standing at the upper terminal, its live brush 42 is disposed on the contact segment S4, thereby energizing the position relay 4H by a circuit extending from the supply conductor L+1 through coil 4H, contact segment S4, brush 42 and contact members F2 to the supply conductor L—1. The energization of the relay 4H closes its contact members 4H1 and opens its contact members 4H2. The closing of the contact members 4H1 lights the lamp 5CL in the position indicator 10 by a circuit extending from the supply conductor L+1 through the contact members 4H1 and F3 and the lamp 5CL to the supply conductor L—1. The lighting of the lamp 5CL illuminates the numeral 5 in the position indicator 10, thereby indicating to passengers in the car that the car is at the fifth floor. The opening of the contact members 4H2 limits the down direction circuit 46 of the direction and position indicator 15, so that only the lamp 5FL is lighted while the car is at the fifth floor.

It will be assumed now that the car moves downwardly to the fourth floor. This action causes the brush 42 to leave the contact segment S4 and engage the contact segment S3, thereby deenergizing the position relay 4H and energizing the position relay 3H. The deenergization of the relay 4H opens its contact members 4H1, thereby extinguishing the lamp 5CL in the indicator in the car. The closing of the contact members 4H2 extends the down direction circuit 46, so that it now includes the position direction lamp 4FL.

The energization of the relay 3H closes its contact members 3H1 and opens its contact members 3H2. The closing of the contact members 3H1 lights the lamp 4CL in the indicator in the car, by a circuit extending from the supply conductor L+1 through the contact members 3H1 and F4 and the lamp 4CL to the supply conductor L—1. The lighting of the lamp 4CL indicates to the passengers in the car that the car is now at the fourth floor. The opening of the contact members 3H2 limits the down direction circuit 46 to the lamps 5FL and 4FL in the indicator 15. Inasmuch as both the lamps 5FL and 4FL are lighted, thereby illuminating their corresponding numerals 5 and 4 in the indicator at the dispatcher's desk, the dispatcher is informed that the car is at the fourth floor on a down trip.

Assuming now that the car is reversed for the purpose of returning it to the fifth floor, the reversal opens the control switch DC and closes the control switch UC. The opening of the control switch DC deenergizes the down direction relay F, which then closes its contact members F1, thereby energizing the up direction relay E. The deenergization of the relay F also opens its contact members F1 to F8, inclusive, thereby disconnecting the brush 42 from the supply conductor L—1, disconnecting the lamps 1CL to 5CL for operation for the down direction, and opening the down direction circuit 46 to prevent operation of the lamps 1FL to 5FL for the down direction while the car is operating upwardly.

The energization of the relay E opens its contact members E1 and closes its contact members E2 to E8, inclusive. The closing of the contact members E2 connects the brush 41 to the supply conductor L—1. The closing of the contact members E3 to E7, inclusive, prepares the circuits of the lamps 1CL to 5CL for operation for the up direction. The closing of the contact members E8 closes the up direction circuit 44 for the lamps 1FL to 5FL, inclusive.

Inasmuch as the car is standing at the fourth floor, the live brush 41 is disposed on the contact segment S4, thereby energizing the position relay 4H to close its contact members 4H1 and open its contact members 4H2. The closing of the contact members 4H1 lights the lamp 4CL by a circuit extending from the supply conductor L+1 through the contact members 4H1 and E4 and the lamp 4CL to the supply conductor L—1. The lighting of the lamp 4CL behind the numeral 4 in the position indicator disposed in the car indicates to the passengers in the car that the car is positioned at the fourth floor. The opening of the contact members 4H2 limits the up direction circuit 44 so that the terminal indicator lamp 5FL for the fifth floor is extinguished but the terminal indicator lamps 1FL, 2FL, 3FL and 4FL for the first, second, third and fourth floors, are lighted to indicate to the dispatcher that the car is now operating in the up direction and is at the fourth floor.

By reason of the foregoing descriptions, it is seen that the systems shown in Figs. 6 and 6A, and 7 and 7A provide a position and a position and direction indicator which may be operated by the use of only one row of contact segments, in combination with one or two brushes, thereby decreasing the cost of the floor selector and also enabling the builder to use small and standard forms of selectors which require only a small space in the penthouse or other location in which they are erected.

Although I have illustrated and described only two forms of my invention, I realize that many changes and modifications may be made therein without departing from the spirit and scope of the invention.

I claim as my invention:

1. In an elevator system for operating a car in a hatchway past a plurality of floors, a position indicator for indicating the position of the car relative to the floors, a position and direction indicator for indicating the position of the car and its direction of operation with reference to the floors, a single row of contact segments, contact brush means, means responsive to operation of the car for moving the brush means over the contact segments, control means responsive to the direction of operation of the car and means responsive to operation of the brush means on said contact segments and operation of the control means for operating both indicators.

2. In an elevator system for operating a car in a hatchway past a plurality of floors, direction means responsive to the direction of operation of the car, a single row of contact segments, brush means for engaging the contact segments, means for moving the brush means over said contact segments in accordance with the movements of the car, an indicator responsive to the position of the brush means on the contact segments for indicating one condition of the car and a second indicator device responsive to said position of the brush means on the contact segments and to the operation of the direction means for indicating another condition of the car.

3. In an elevator system for operating a car in a hatchway past a plurality of floors, a position indicator for indicating the position of the car relative to the floors, a position and direction indicator for indicating the position of the car and its direction of operation with reference to the floors, a plurality of position electromagnetic devices, only one for each floor, a row of contact segments, a contact brush, and means responsive to movement of the car for causing the contact brush to sequentially engage the contact segments for sequentially connecting the electromagnetic devices to a source of energy in accordance with the position of the car relative to the floors, means responsive to operation of the said electromagnetic means for operating the position indicator, direction means responsive to the direction of operation of the car, and means responsive to the operation of said electromagnetic devices and said direction means for operating the position and direction indicator.

4. In an elevator system for operating a car in a hatchway past a plurality of floors, a group of lamps, one for each floor for indicating the position of the car with reference to the floors, a second group of lamps, one for each floor, for indicating the position and direction of operation of the car with reference to the floors, circuits for the lamps including a direction circuit for the second group of lamps, switches for the circuits, a pair of direction relays for controlling the direction circuit, a plurality of position relays for cooperation with the direction relays in controlling the switches in the circuits to complete a circuit for only that lamp in the first group of lamps corresponding to the position of the car and for cooperation with the direction relays in operating the switches in the second group of lamps for energizing that lamp in the second group representing the position of the car and for also energizing the lamps representing the floors past which the car has travelled on its present trip, means responsive to the direction of operation of the car for operating the direction relays, and means responsive to the position of the car for operating the position relays in accordance with the position of the car.

5. In an elevator system for operating a car in a hatchway past a plurality of floors, a group of lamps, one for each floor, for indicating the position of the car with reference to the floors, a second group of lamps, one for each floor, for indicating the position and direction of operation of the car with reference to the floors, a circuit for each of the lamps in the first group, an individual circuit and a direction circuit for each of the lamps in the second group, a pair of direction relays and a plurality of position relays for operating the said circuits to energize that lamp in the first group of lamps representing the position of the car and for energizing that lamp in the second group of lamps representing the position of the car and also those lamps in the second group of lamps representing the floors past which the car has moved in its present direction of operation, means responsive to the direction of operation of the car for operating the direction relays, and means responsive to the position of the car for operating the position relays.

6. In an indicating system for an elevator car operating in a hatchway past a plurality of floors, a direction circuit, a plurality of signal devices, one for each of said floors, each device being connected by an individual junction point to the direction circuit intermediate its ends, means responsive to operation of the car in the up direction for connecting one end of the direction circuit to a source of energy, means responsive to operation of the car in the down direction for connecting the other end of the direction circuit to the source of energy, a plurality of contact members disposed in the direction circuit between each pair of adjacent junction points, and means responsive to the position of the car for controlling in cooperation with the direction means the contact members in the direction circuit to energize only that portion of the direction circuit connected to the signal devices corresponding to adjacent floors in the direction opposite to the direction of travel of the car.

7. In an indicating system for an elevator car operating in a hatchway past a plurality of floors, a direction circuit, a plurality of signal devices, one for each of said floors, each device having one terminal connected to the direction circuit at an individual junction point intermediate its ends and its other terminal connected to the supply circuit, means responsive to operation of the car in the up direction for connecting one end of the direction circuit to the source of energy, means responsive to operation of the car in the down direction for connecting the other end of the direction circuit to the source of energy, a plurality of contact members disposed in the direction circuit between each pair of adjacent junction points, an individual circuit for each signal device, a pair of cooperating contact members in each individual circuit, and means responsive to the position of the car for closing the contact members in the individual circuit for the signal device corresponding to the floor at which the car is located and for controlling in cooperation with the direction means the contact members of the direction circuit to energize only that portion of the direction circuit connected to the signal devices corresponding to adjacent floors in the direction opposite to the direction of travel of the car, for energizing the signal devices to indicate the position and direction of operation of the car.

8. In an indicating system for an elevator car operating in a hatchway past a plurality of floors, a direction circuit, a plurality of signal devices, one for each of said floors, each device being connected to the direction circuit at an individual junction point intermediate its ends, means responsive to operation of the car in the up direction for connecting one end of the direction circuit to a source of energy, means responsive to operation of the car in the down direction for connecting the other end of the direction circuit to the source of energy, a plurality of normally closed pairs of contact members disposed in the direction circuit between each pair of adjacent junction points, an individual circuit for each signal device, a pair of normally open contact members in each individual circuit, and means responsive to the position of the car for closing the contact members in the individual circuit for the signal device corresponding to the floor at which the car is located and for opening the contact members in that portion of the direction circuit connected to the signal devices corresponding to the floor at which the car is located and to adjacent floors in the direction of travel of the car.

9. In an elevator system for operating a car in a hatchway past a plurality of floors, a direction circuit, a plurality of signal devices, one for each of said floors, each device being connected to the direction circuit at an individual junction point intermediate its ends, an up direction relay responsive to operation of the car in the up direction for connecting one end of the direction circuit to a source of energy, a down direction relay responsive to operation of the car in the down direction for connecting the other end of the direction circuit to the source of energy, a plurality of normally closed pairs of contact members disposed in the direction circuit between each pair of adjacent junction points, an individual circuit for each signal device, a pair of normally open contact members in each individual circuit, and position relays responsive to the position of the car for closing the contact members in the individual circuit for the signal device corresponding to the floor at which the car is located and for opening the contact members in that portion of the direction circuit connected to the signal devices corresponding to the floor at which the car is located and to adjacent floors in the direction of travel of the car.

10. In an elevator system for operating a car in a hatchway past a plurality of floors, a plurality of lamps one for each floor, for indicating the position of the car with reference to the floors, a plurality of lamps, one for each floor, for indicating the position and direction of operation of the car with reference to the floors, a circuit for each group of lamps, a single row of contact segments, a brush, means responsive to movement of the car for moving the brush over the said contact segments in accordance with the movement of the car, means responsive to operation of the brush on said contact segments for controlling the circuit of the position indicating lamps to connect to a source of energy only that lamp representing the floor corresponding to the position of the car, direction means responsive to the direction of operation of the car, and means responsive to the said operation of the brush on the contact segments and the operation of the direction means for controlling the circuit of the position and direction indicating lamps to connect to a source of energy only the position and direction indicating lamps corresponding to the floors so far passed by the car on its present trip and to the lamp representing the floor corresponding to the position of the car.

11. In an elevator system for operating a car in a hatchway past a plurality of floors, a position indicator for indicating the position of the car with reference to the floors, a position and direction indicator for indicating the position and direction of operation of the car with reference to the floors, a pair of direction relays and a plurality of position relays, a single row of contact segments, cooperating brush means therefor, means responsive to operation of the car for moving the brush means over the contact segments in accordance with the movement of the car for the purpose of operating said position relays in accordance with the movements of the car, means responsive to the direction of operation of the car for rendering effective the direction relay corresponding to the direction of operation of the car, means responsive to operation of the position relays for operating the position indicator, and means jointly responsive to operation of the position relays and the direction relays for operating the position and direction indicator.

HAROLD W. WILLIAMS.